(12) United States Patent  (10) Patent No.: US 9,114,678 B1
Olson et al.  (45) Date of Patent: Aug. 25, 2015

(54) HITCH LOCK (71) Applicant: POWER PIN INC., Fort Qu'Appelle, Saskatchewan (CA)

(72) Inventors: Brian R. Olson, Fort Qu'Appelle (CA); Lloyd Wach, Grand Marais (CA)

(73) Assignee: POWER PIN INC., Saskatchewan (CA)

( * ) Notice: Subject to any disclaimer, the term of this patent is extended or adjusted under 35 U.S.C. 154(b) by 0 days.

(21) Appl. No.: 14/370,075

(22) PCT Filed: Sep. 4, 2013

(86) PCT No.: PCT/CA2013/000752
§ 371 (c)(1),
(2) Date: Jul. 1, 2014

(87) PCT Pub. No.: WO2014/063224
PCT Pub. Date: May 1, 2014

(30) Foreign Application Priority Data

Oct. 25, 2012 (CA) .................................. 2793332

(51) Int. Cl.
*B60D 1/04* (2006.01)
*B60D 1/06* (2006.01)
*B60D 1/28* (2006.01)

(52) U.S. Cl.
CPC .. *B60D 1/04* (2013.01); *B60D 1/06* (2013.01); *B60D 1/28* (2013.01)

(58) Field of Classification Search
CPC ............... B60D 1/04; B60D 1/06; B60D 1/28
See application file for complete search history.

(56) References Cited

U.S. PATENT DOCUMENTS

| 1,375,266 | A | * | 4/1921 | Weber ............................ 280/510 |
| 1,408,501 | A | * | 3/1922 | Clement ....................... 280/504 |
| 1,411,230 | A | * | 3/1922 | Weber ............................ 280/504 |
| 1,635,659 | A | * | 7/1927 | Clement ....................... 280/510 |
| 2,491,143 | A | * | 12/1949 | Weiss ............................. 280/504 |
| 3,128,107 | A | | 4/1964 | Miller et al. |
| 3,963,266 | A | | 6/1976 | Thelin |
| 5,332,250 | A | | 7/1994 | Thorwall et al. |
| 5,725,229 | A | | 3/1998 | McWethy |
| 6,139,043 | A | | 10/2000 | Gries et al. |

FOREIGN PATENT DOCUMENTS

| CA | 2011456 A1 | 11/1990 |
| CA | 2038015 A1 | 12/1991 |
| DE | 10151382 A1 | 4/2003 |

* cited by examiner

*Primary Examiner* — Kevin Hurley
(74) *Attorney, Agent, or Firm* — King & Schickli, PLLC (57) ABSTRACT

A hitch apparatus has a base with rearward extending upper and lower jaws. A pin extends upward from a rear end of the lower jaw. A lock plate is pivotally attached to a rear portion of the upper jaw limit can pivot through a pivot range from a closed position through a balanced position to an open position. When the lock plate is between the closed and balanced positions, gravity biases same toward the closed position where a locking portion of the lock plate extends downward into the gap and the closed stop prevents rearward movement thereof. The locking portion moves forward and upward as the lock plate pivots from the closed position to the open position, and when the lock plate is between the balanced and open positions, gravity biases same toward the open position where the locking portion extends upward.

25 Claims, 11 Drawing Sheets

HITCH LOCK

This invention is in the field of hitches for connecting a trailer or like towed vehicle to a towing vehicle, and in particular a hitch apparatus with a self-locking feature.

BACKGROUND

Connecting mechanisms for towed vehicles take a variety of forms, such as clevis and tongue mechanisms, ball and socket mechanisms, pintle hook and ring mechanisms, and the like.

Clevis and tongue mechanisms require a separate pin which is inserted downward through aligned holes in the drawbar and clevis. In contrast ball and socket mechanisms and pintle book and ring mechanisms comprise only an upward extending lower male hitch member, being the pintle hook or ball, that is attached to the towing vehicle, and a female hitch member, the ring or socket, that is attached to the trailer tongue and drops over and engages the male hitch member make the connection. No separate connecting pin is required. A lock mechanism prevents the male and female members from disengaging.

A typical pintle hook and ring hitch has base for attachment to the towing vehicle and a hook like lower jaw curving rearward and upward from the base to form the pintle hook, and an upper jaw pivotally attached to base. To connect a towed vehicle, the upper jaw is raised and latched into the open position creating a gap between the top of the pintle hook and the upper jaw. The towing vehicle is moved rearward and the ring on the tongue of the towed vehicle moves through the gap and then the tongue is lowered so that the ring drops over the pintle hook and rests on the bottom of the lower jaw. The upper jaw is then pivoted downward to a closed position where the outer end of the upper jaw is close to the upper end of the pintle hook, and the gap is closed preventing the ring from disengaging from the pintle hook.

The upper jaw typically includes a latch mechanism to latch it in either the open or closed positions, and a safety pin is typically required to lock the upper jaw in the closed position in case the latch fails. Such a pintle hook and ring hitch is described for example in U.S. Pat. No. 5,332,250 to Thorwall et at.

In ball and socket hitches the socket mechanism on the trailer tongue typically includes some manner of clamp mechanism that engages the bottom surface of the ball to prevent the socket from moving upward out of engagement with the ball.

U.S. Pat. No. 3,963,266 discloses a combination hitch apparatus with a ball on the lower male hitch member extending up from the lower jaw. The ring on a trailer tongue can drop over the ball to rest on the lower jaw, or a socket on a trailer tongue can drop onto the ball. In either case the upper jaw moves down to closed position where the outer end of the upper jaw is close to the upper end of the ball to prevent the socket from moving upward off the ball, and also to close the gap between the upper and lower jaws to prevent a ring from disengaging the lower male hitch member. U.S. Pat. No. 6,139,043 to Gries et al. and U.S. Pat. No. 5,725,229 to McWethy also disclose combination hitch apparatus for use with either a ring or socket type trailer tongue.

SUMMARY OF THE INVENTION

It is an object of the present invention to provide a hitch apparatus that overcomes problems in the prior art.

In a fast embodiment the present invention provides a hitch apparatus for connecting a towed vehicle to a towing vehicle, the apparatus comprising a base adapted at a forward end thereof for attachment to a owing vehicle, with a lower jaw fixed to and extending rearward from the base, and a male hitch member extending upward from a rear end of the lower jaw. An upper jaw is fixed to and extends rearward from the base above the lower jaw to a rear end thereof located above the male hitch member such that a gap is formed between the rear end of the upper jaw and a top end of the male hitch member. A lock plate is pivotally attached to a rear portion of the upper jaw about a pivot axis oriented substantially perpendicular to an operating travel direction. A closed stop and an open stop are operative to limit pivoting movement of the lock plate to a pivot range from a closed position through a balanced position to an open position. The lock plate is configured such that when the lock plate is in the pivot range between the closed position and the balanced position gravity biases the lock plate toward the closed position, and when the lock plate is between the balanced position and the open position gravity biases the lock plate toward the open position. When the lock plate is in the closed position, a locking portion of the lock plate extends downward from the pivot axis into the gap and the closed stop prevents rearward movement of the locking portion, and the locking portion of the lock plate moves forward and upward as the lock plate pivots from the closed position to the open position, and when the lock plate is in the open position, the locking portion extends upward from the pivot axis and the open stop prevents rearward movement of the locking portion.

In a second embodiment the present invention provides a method of connecting a towed vehicle to a towing vehicle. The method comprises attaching a forward end of a base to the towing vehicle; providing a lower jaw fixed to and extending rearward from the base, and providing an upward extending male hitch member at a rear end of the lower jaw; providing an upper jaw fixed to and extending rearward from the base above the lower jaw to a rear end thereof located above the male hitch member such that a gap is formed between the rear end of the upper jaw and a top end of the male hitch member; pivotally attaching a lock plate to a rear portion of the upper jaw about a pivot axis oriented substantially perpendicular to an operating travel direction of the towing vehicle such that a locking portion of the lock plate extends downward into the gap when the lock plate is in a closed position; providing a closed stop operative to prevent rearward movement of the locking portion of the lock plate when in the closed position such that the locking portion can only pivot forward from the closed position; configuring the lock plate such that when the lock plate is in a pivotal position between the closed position and a balanced position, gravity biases the lock plate toward the closed position; providing a female hitch member on a front end of a hitch tongue attached to the towed vehicle and aligning a vertical position of the female hitch member with the gap; with the lock plate in the closed position, moving the towing vehicle rearward such that a front end of the female hitch member moves through the gap and pushes the locking portion of the lock plate forward; continuing moving the towing vehicle rearward until the front end of the female hitch member contacts a rear end of the base between the upper and lower jaws, where the lock plate drops toward the closed position to a blocking position preventing the female hitch member from moving rearward through the gap; lowering the female hitch member into engagement with the male hitch member at which point the lock plate is in the closed position and the locking portion prevents disengagement of the female hitch member from the male hitch member.

The present invention thus provides a simple hitch apparatus that can include a convenient reset feature so same is always ready for connection to a towed vehicle. The lock plate does not require any spring latches as are common in the prior art and the lock plate is prevented from moving because same bears against a stop that is an integral part of the apparatus. The risk of mistakes in connection that could lead to disengagement is low since no manipulation of any latches is required.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-4 illustrate an embodiment of a hitch apparatus 1 of the present invention for connecting a towed vehicle to a towing vehicle. The hitch apparatus 1 comprises a base 3 adapted at a forward end thereof for attachment to a towing vehicle 5, as schematically illustrated in FIG. 5. The base 3 is illustrated as a bar configured to be inserted into a hitch receiver as is known in the art, however other configurations are contemplated as well, such as a plate adapted to be bolted to the towing vehicle, and like arrangements.

Figure 7A:
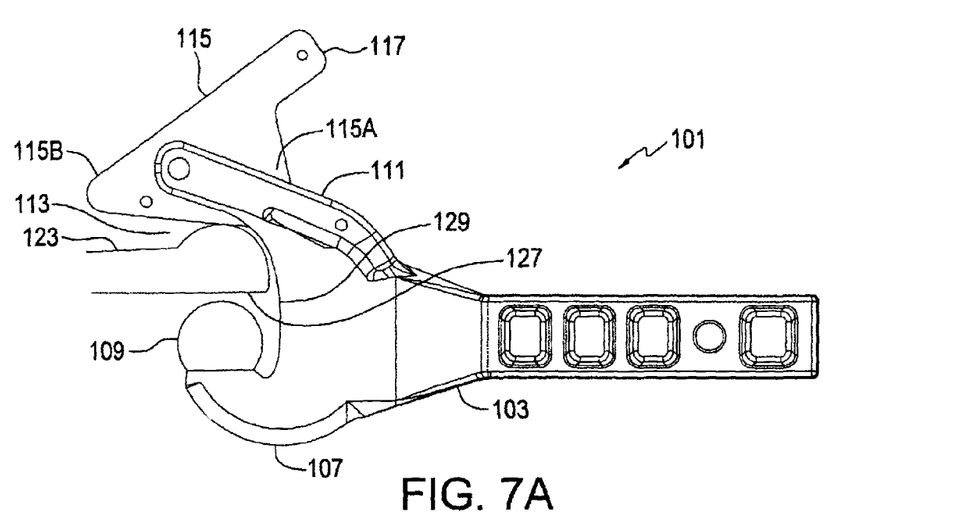
FIG. 7A is a side view of an alternate embodiment of a hitch apparatus of the present invention where the male hitch member is a ball, and the female hitch member is a socket member, and where the socket member has moved through the gap pushing the lock plate forward out of the gap, and with the socket aligned over the ball.
Figure 7B:
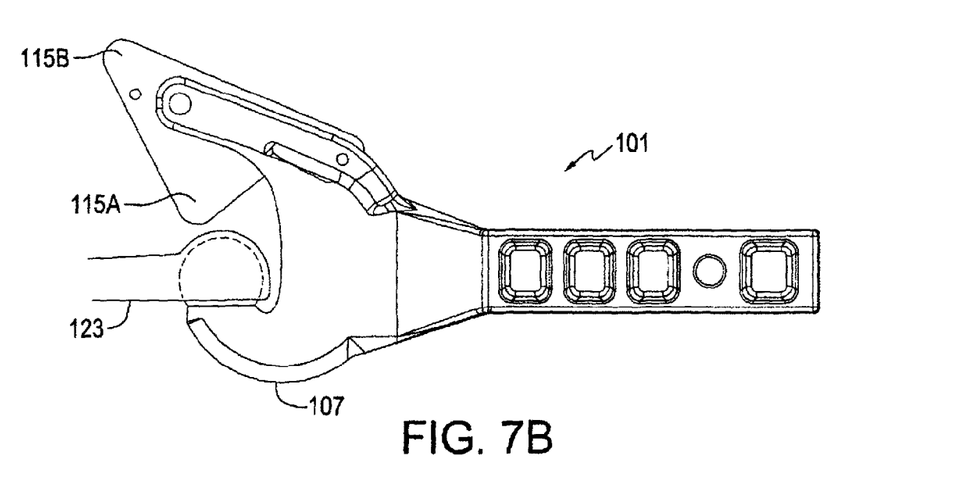
FIG. 7B is a side view of the embodiment of FIG. 7A where the socket member has been lowered such that the socket is engaged on the ball and the lock plate has returned to the closed position.
Figure 7C:
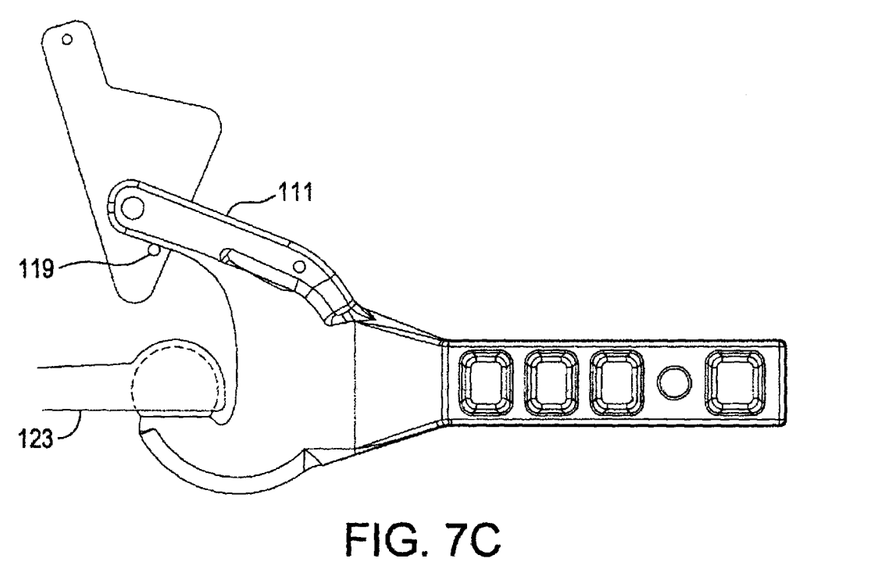
FIG. 7C is a side view of the embodiment of FIG. 7A where the lock plate has been moved to the open position to allow the socket member to be raised to disengage the ball.
Figure 7D:
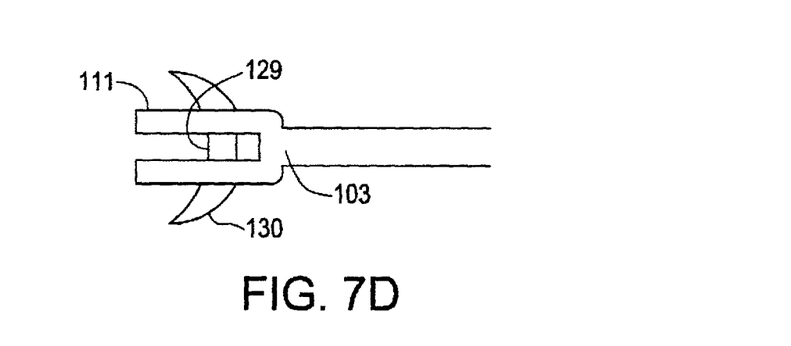
FIG. 7D is a top view of the embodiment of FIG. 7A with the lock plate removed.

A lower jaw 7 is fixed to and extends rearward from the base 3, and a male hitch member 9 extends upward from a rear end of the lower jaw 7. The male hitch member 9 in FIGS. 1-4 is illustrated as a pin as used in a pintle hook and ring hitch system, but could also be a ball as used in a ball and socket hitch system, and as illustrated in FIGS. 7A-7C.

An upper jaw 11 is fixed to and extends rearward from the base 3 above the lower jaw 7. The rear end 11R of the upper jaw 11 located above the male hitch member 9 such that a gap 13 is formed between the rear end 7R of the upper jaw 7 and a top end of the male hitch member 9.

A lock plate 15 is pivotally attached to a rear portion of the upper jaw 11 in a slot 21 in the upper jaw 11 about a pivot axis PA oriented substantially perpendicular to an operating travel direction T. A closed stop 17 and an open stop 19 are operative to limit pivoting movement of the lock plate 15 to a pivot range from a closed position, shown in FIG. 3, through a balanced position, shown in FIG. 3A, to an open position, shown in FIG. 3B.

The lock plate 15 is configured such that when the lock plate 15 is in the pivot range between the closed position and the balanced position, gravity biases the lock plate 15 toward the closed position, and when the lock plate is between the balanced position and the open position gravity biases the lock plate 15 toward the open position. Thus the lock plate 15 can be manually flipped between the open position and the closed position, and will stay in the selected position until a force is exerted on same to move it.

Figure 1:
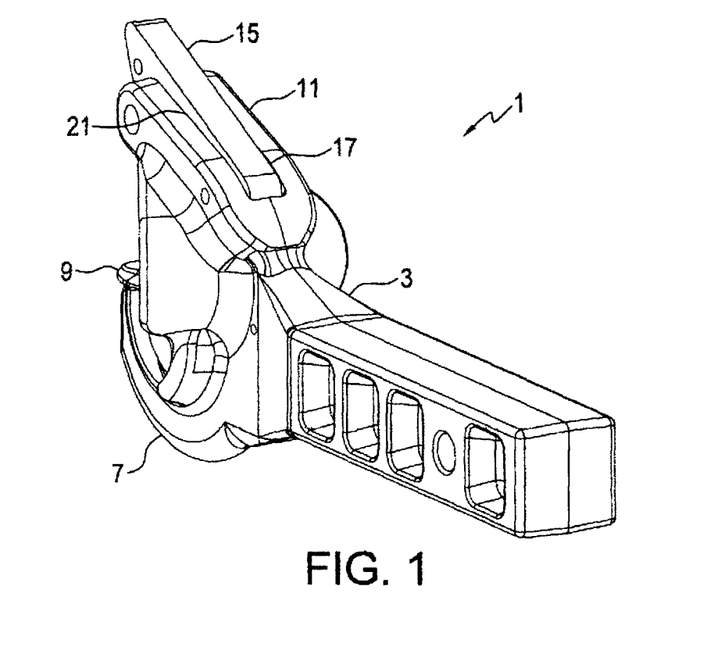
FIG. 1 is a rear perspective view of an embodiment of a hitch apparatus of the present invention where the male hitch member is a pin, and with the lock plate in the closed position.
Figure 2:
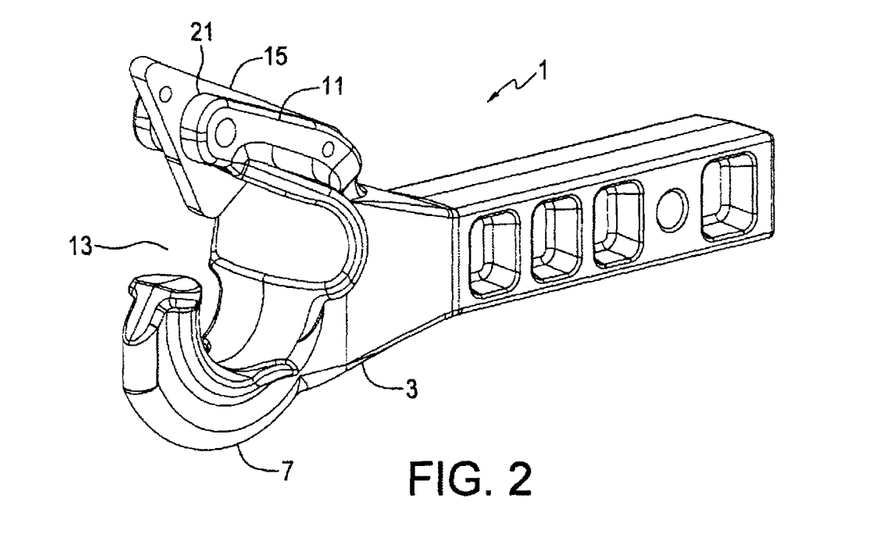
FIG. 2 is a front perspective view of the embodiment of FIG. 1 with the lock plate in the closed position.
Figure 3:
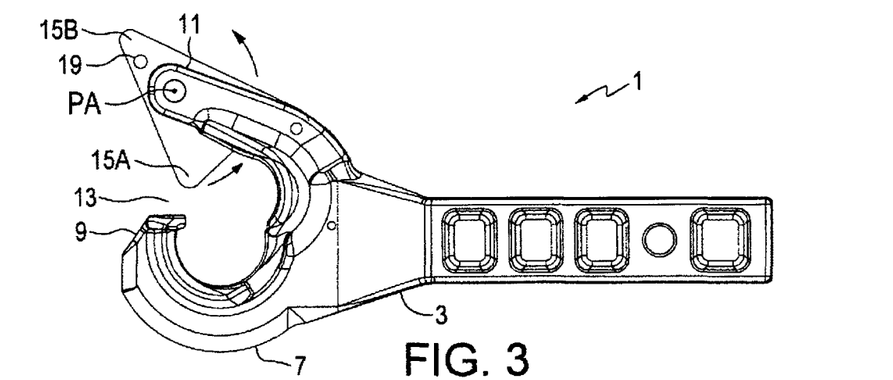
FIG. 3 is a side view of the embodiment of FIG. 1 with the lock plate in the closed position.

When the lock plate is in the closed position of FIG. 3, a locking portion 15A of the lock plate 15 extends downward from the pivot axis PA into the gap 13 and the closed stop 17 bears against the bottom of a rear portion of the slot 21 in the upper jaw 11 and prevents rearward movement of the locking portion 15A. The locking portion 15A of the lock plate 15 moves forward and upward (as indicated by the arrows in FIGS. 3, 3A) as the lock plate 15 pivots from the closed position to the open position, and when the lock plate 15 is in the open position, the locking portion 15A extends upward from the pivot axis PA and the open stop 19 bears against the bottom of the upper jaw 11 on either side of the slot 21 and prevents further rearward movement of the locking portion 15A.

FIG. 5 schematically illustrates the hitch apparatus 1 attached to a towing vehicle 5, and a corresponding female hitch member provided by a hitch ring 23 attached to a hitch tongue of a towed vehicle 25. The male hitch member 9 comprises a pin adapted to enter a ring opening 27 defined by the hitch ring 23, as illustrated in the schematic sectional view of FIG. 5D. The hitch tongue of the towed vehicle 25 is moved up or down as required to align the hitch ring 23 with the gap 13 in the hitch apparatus 1 attached to the towing vehicle 5.

Figure 5:
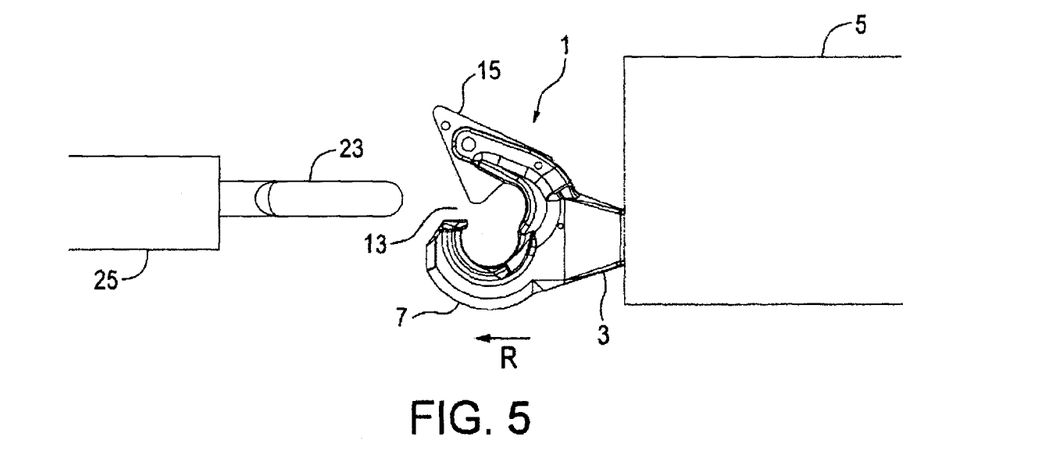
FIG. 5 is schematic side view of the embodiment of FIG. 1 attached to a towing vehicle and about to be connected to a towed vehicle where the female hitch member on the towed vehicle is provided by a hitch ring.
Figure 5A:
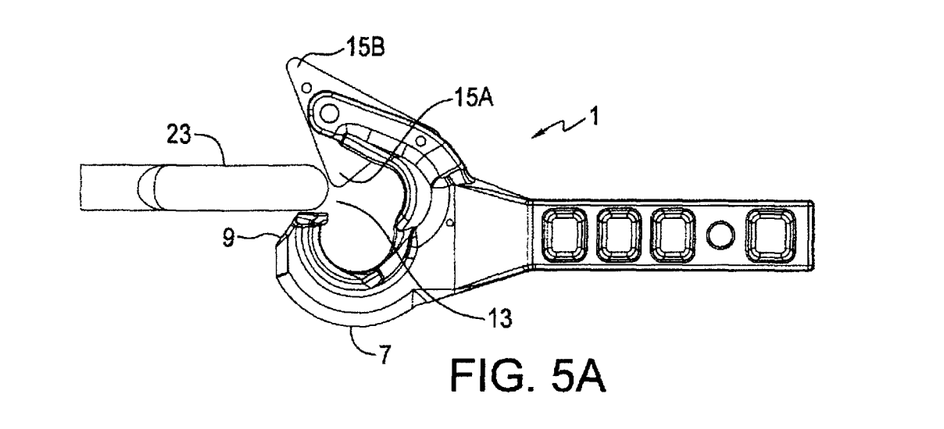
FIGS. 5A-5F are side views showing the connecting sequence for connecting the hitch ring on the towed vehicle of FIG. 5 to the embodiment of FIG. 1 attached to the towing vehicle.
Figure 5B:
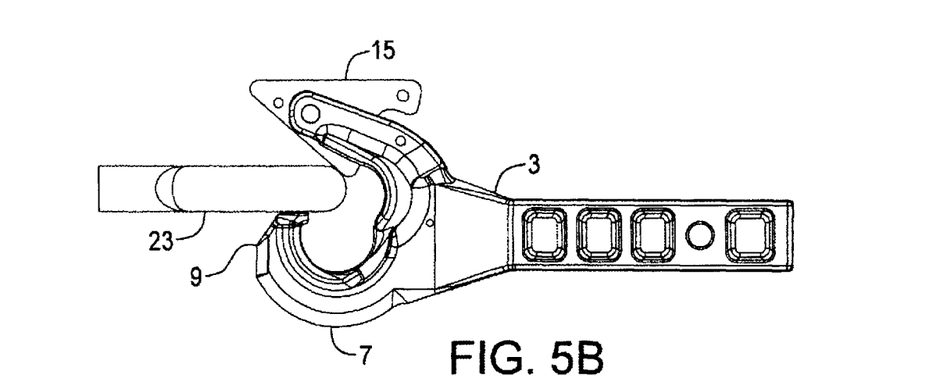
Figure 5C:
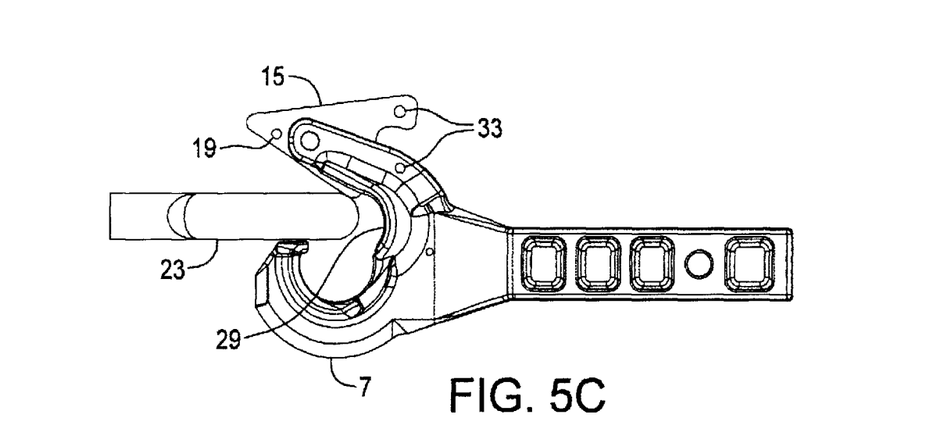
Figure 5D:
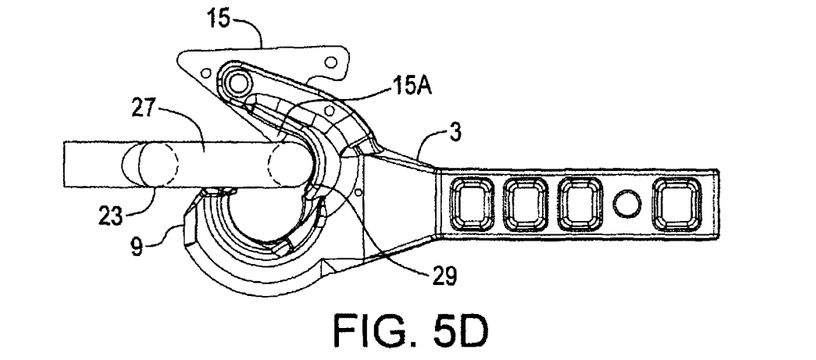
Figure 5E:
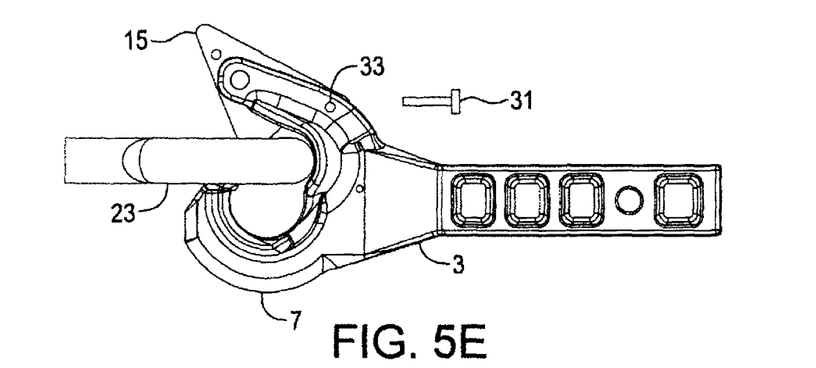

The towing vehicle 5 is then moved in the rearward direction R and the hitch ring 23 enters the gap 13 and contacts the locking portion 15A of the lock plate 15 as shown in FIG. 5A, and as the towing vehicle continues rearward the hitch ring 23 pushes the locking portion 15A forward as shown in FIGS. 5B, 5C until the front end of the hitch ring 23 contacts the hitch ring guide 29 on the rear end of the base 3 between the upper and lower jaws 11, 7 as shown in FIG. 5D, at which point rearward movement stops, and the lock plate 15 clears the inner surface of the hitch ring 23 and drops back down into the gap 13 and into the ring opening 27, as shown in FIG. 5E.

Figure 4:
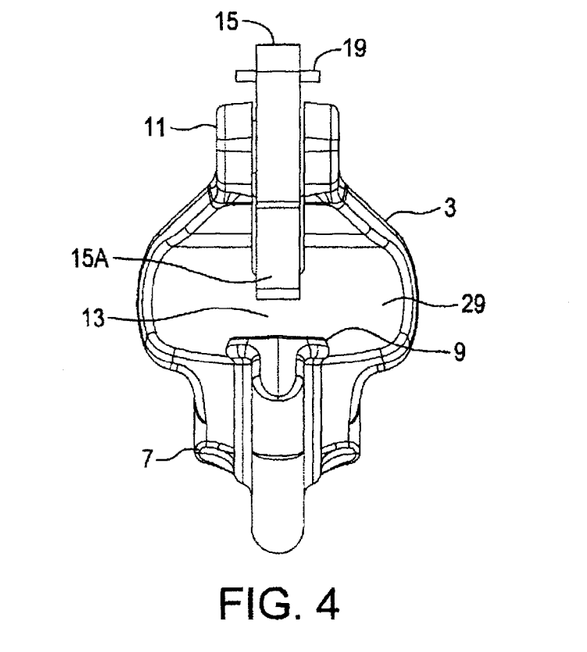
FIG. 4 is an rear end view of the embodiment of FIG. 1.

FIG. 4 is a rear view of the apparatus 1 showing that the base 3 defines a hitch ring guide 29 configured to guide the hitch ring 23 laterally to align the ring opening 27 with the male hitch member 9 provided by the pin. The rear surface of the guide 29 is wider than the jaws 11, 17 and conforms to a significant portion of the front outer surface of the hitch ring 23 such that small lateral misalignments will be corrected as the contact of the front portion of the hitch ring 23 contacts the guide and is pushed laterally. FIG. 4 also most clearly shows the open stop 19 provided by a pin extending laterally from the lock plate 15.

Figure 5F:
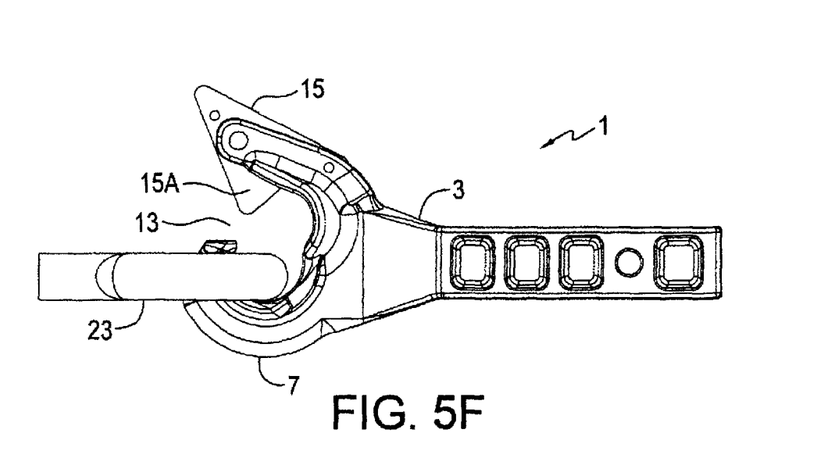

Once the ring opening 27 is aligned with the male hitch member pin 9, the tongue of the towed vehicle 25 is lowered and the hitch ring 23 moves down to rest on the lower jaw 7 in the recess between the base 3 and the male hitch member 9 as shown in FIG. 5F. The lock plate 15 is in the closed position and is prevented from moving rearward, and so the hitch ring 23 is also prevented from moving rearward through the gap 13.

As a precaution to prevent accidental movement of the lock plate 15 forward out of the closed position due to bouncing on rough roads or the like, a safety pin 31 can be removably inserted in corresponding aligned safety holes 33 in the upper jaw 11 and lock plate 15 when the lock plate 15 is in the closed position with the hitch ring 23 resting on the lower jaw 7.

Figure 3A:
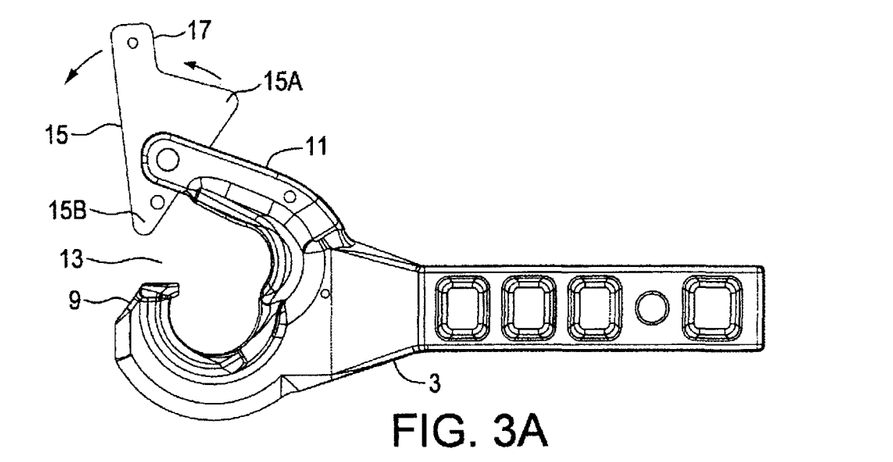
FIG. 3A is a side view of the embodiment of FIG. 1 with the lock plate in the balanced position.
Figure 3B:
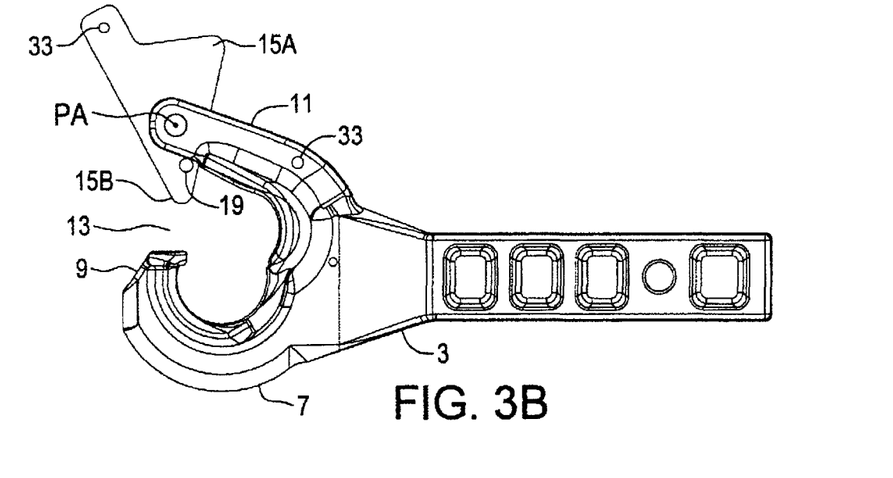
FIG. 3B is a side view of the embodiment of FIG. 1 with the lock plate in the open position.

As a further precaution, in the illustrated apparatus 1 when the lock plate 15 is in the balanced position of FIG. 3A, the locking portion 15A thereof is above a lower edge of the upper jaw 11. Thus a hitch tongue entering the gap 13 cannot tip the lock plate 15 to the open position, but can only push the locking portion 15A lock plate to a pivotal position where the rear edge thereof is at the lower edge of the upper jaw 11, where same is still in the pivot range between the balanced position and the closed position, such that gravity is biasing the lock plate 15 down toward the closed position.

Figure 6A:
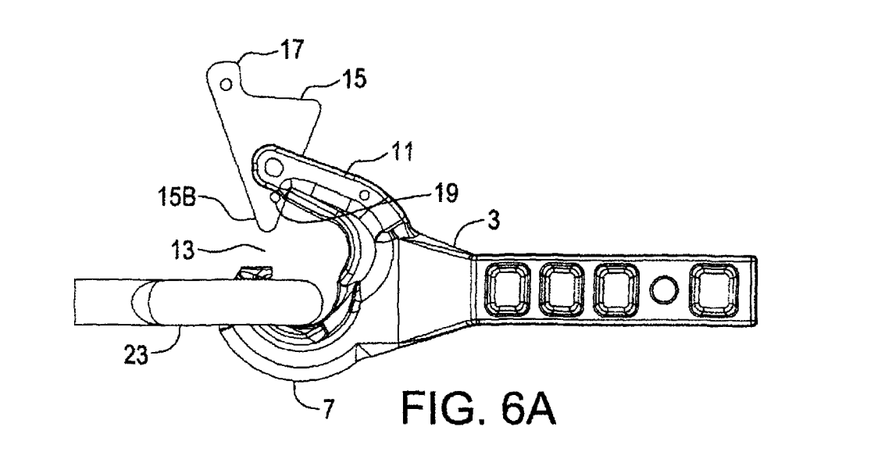
FIGS. 6A-6E are side views showing the disconnecting sequence for disconnecting the hitch ring on the towed vehicle of FIG. 5 from the embodiment of FIG. 1 attached to the towing vehicle.
Figure 6B:
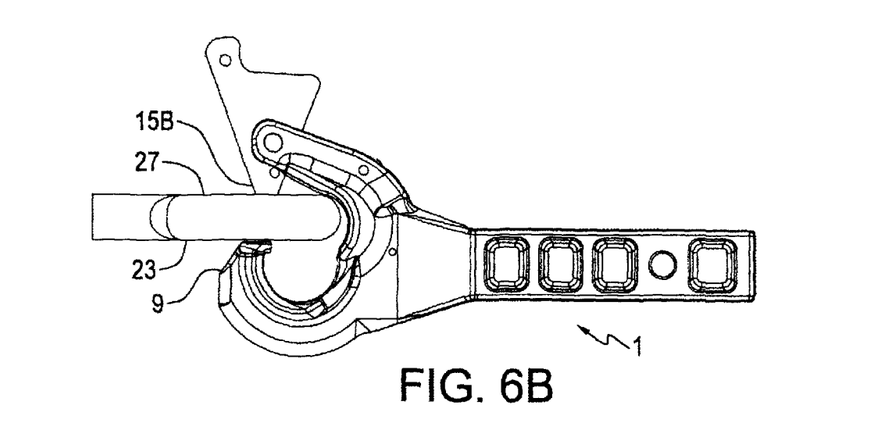
Figure 6C:
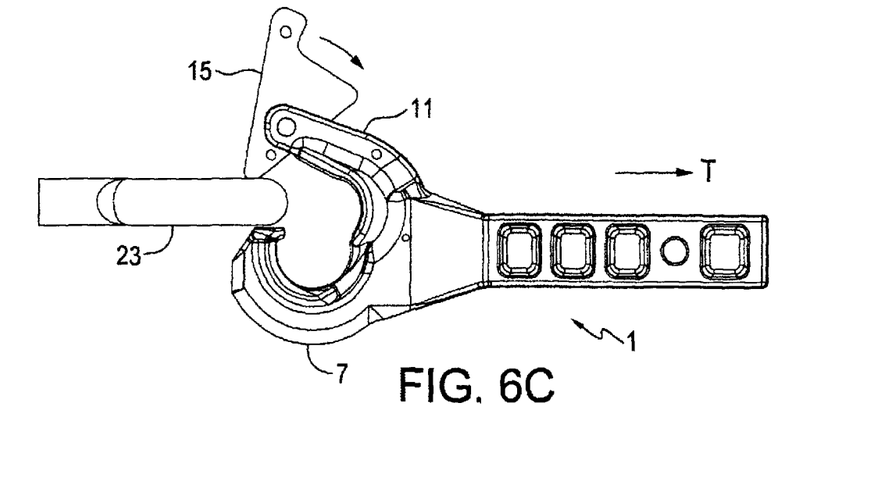
Figure 6D:
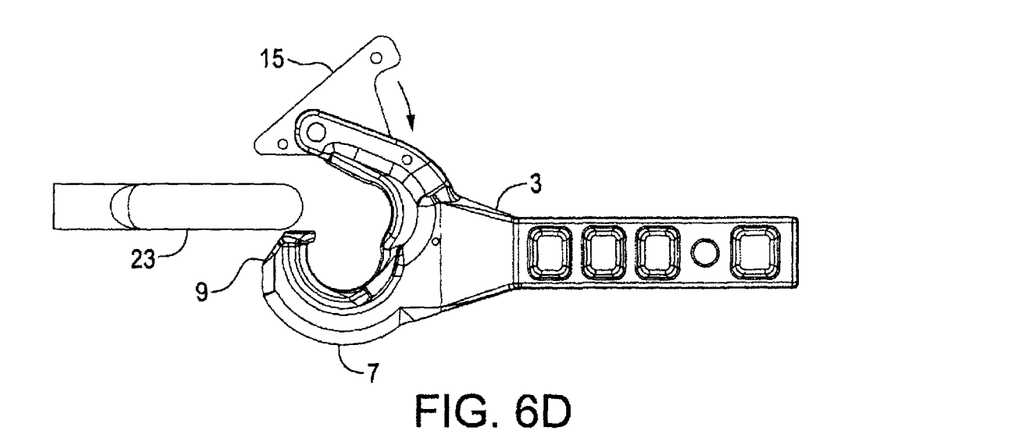

In the illustrated apparatus 1 the lock plate 15 further comprises a resetting portion 15B oriented such that when the lock plate 15 is in the closed position the resetting portion 15B of the lock plate 15 extends upward from the pivot axis PA, and when the lock plate 15 is in the open position the resetting portion 15B of the lock plate 15B extends downward from the pivot axis PA into the gap 13, as shown in FIG. 6A.

The disconnecting sequence is shown in FIGS. 6A-6E. In FIG. 6A the safety pin 31 has been removed and the lock plate 15 has been moved manually to the open position to release the hitch ring 23. The hitch ring 23 is then raised to the position of FIG. 6B, where the resetting portion 15B of the lock plate 15 extends down into the ring opening 27 in the hitch ring 23, and the hitch ring 23 is above the top end of the male hitch member 9. The towing vehicle then moves forward in the operating travel direction T with the hitch apparatus 1 and the hitch ring 23 moves rearward through the gap 13. As the hitch ring 23 moves rearward it contacts the resetting portion 15B of the lock plate 15 and moves same rearward such that the lock plate 15 moves to the position of FIG. 6C which is between the balanced position and the closed position where gravity moves the lock plate through the position of FIG. 6D to the closed position of FIG. 6E, where the hitch ring 23 is disengaged and the towing vehicle and move ahead leaving the towed vehicle at rest.

Figure 6E:
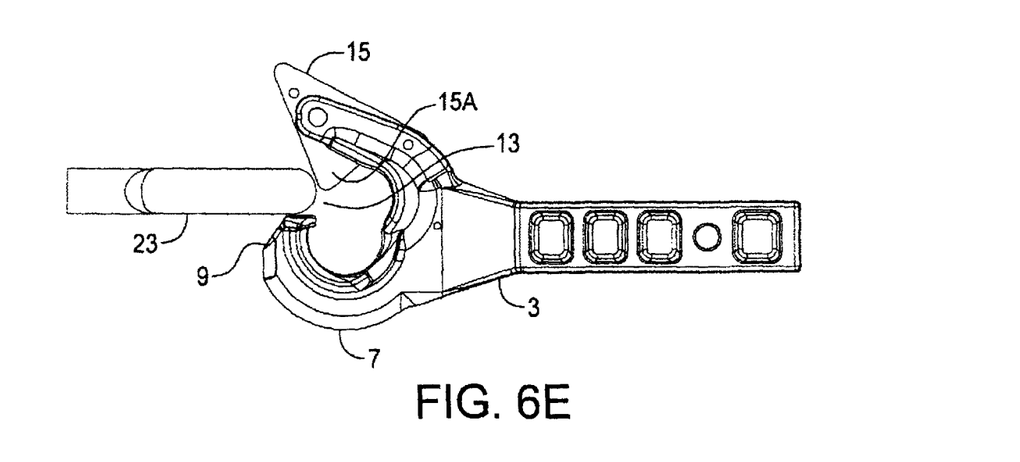

In the position of FIG. 6E, the hitch apparatus 1 is reset in the same closed position as in FIG. 5A, and is ready to back up to another hitch ring to engage the hitch ring for towing a towed vehicle as described above.

FIGS. 7A-7D schematically illustrate an alternate embodiment of a hitch apparatus 101 of the present invention where the top end of the male hitch member defines a ball 109 adapted to enter a corresponding female hitch member provided by a socket member 123 attached to a hitch tongue of a towed vehicle and defining a socket 127. FIG. 7A shows the apparatus 101 backed up so the socket member 123 has passed through the gap 113 and contacted the rear end of the base 103. The socket 127 is aligned above the ball 109, and rearward movement is stopped. The socket member 123 is guided into alignment by a socket guide 129 on the rear end of the base 103. The rear surface of the guide 129 includes wings 130, shown in the lop view of FIG. 7D only, that are wider than the jaws 107, 111 and conform to a significant portion of the front outer surface of the socket member 123 such that small lateral misalignments will be corrected as the contact of the front portion of the socket member 123 contacts the guide and is pushed laterally. The wings 130 have been deleted from FIGS. 7A-7C to more clearly illustrate the relative positions of the socket member 123, lock plate 115, and the ball 109. Similarly the lock plate 115 has been deleted from FIG. 7D to more clearly show the socket guide 129.

In the position of FIG. 7A the socket member 123 has pushed the lock plate 115 rearward out of the closed position but still in the pivot range between the closed position and the balanced position such that when the socket member is lowered so the ball 109 enters the socket 127 as shown in FIG. 7B, the lock plate drops back to the closed position. It can be seen that if the socket member 123 moves upward off the ball 109, it will contact the locking portion 115A of the lock plate 115 and push the locking portion rearward, but movement of the locking portion 115A rearward is prevented by the closed stop 117.

FIG. 7C shows the lock member after same has been manually moved to the open position to disconnect the towed and towing vehicles, where the resetting portion 115B of the lock plate extends down into the gap 113 and the open stop 119 hears against the bottom edge of the upper jaw 111. Again it can be seen that when the socket member 123 is raised it will contact the resetting portion 115B of the lock plate 115 and move same rearward as the socket member 123 is raised, and as the hitch apparatus 1 is moved forward, the socket member 123 will move the resetting portion 115B further rearward so the lock plate 115 passes the balanced position and falls down to the closed position, ready to engage another socket member.

Figure 8:
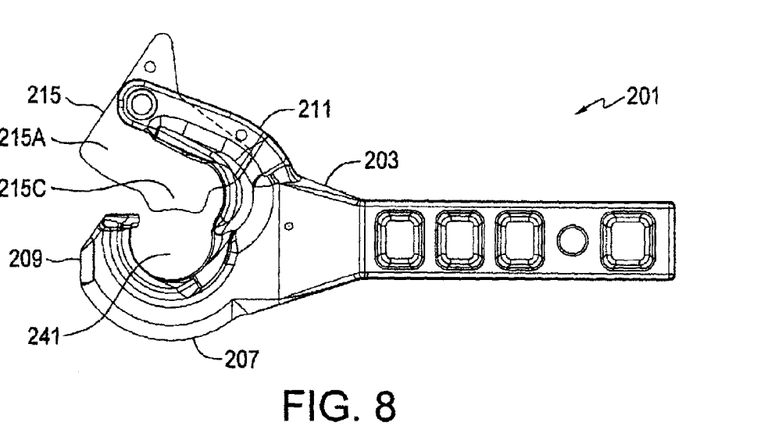
FIG. 8 is a side view of an alternate embodiment of a hitch apparatus of the present invention where a front portion of the locking portion of the lock plate extends over a hitch recess formed between the rear end of the base and a top end of the pin.
Figure 8A:
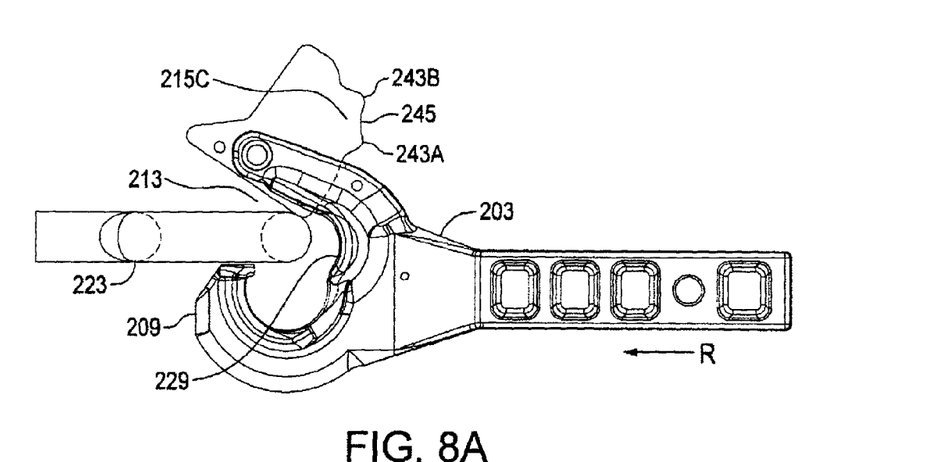
FIGS. 8A-8C are side views showing the connecting sequence for connecting the hitch ring on a towed vehicle to the embodiment of a hitch apparatus of FIG. 8.
Figure 8B:
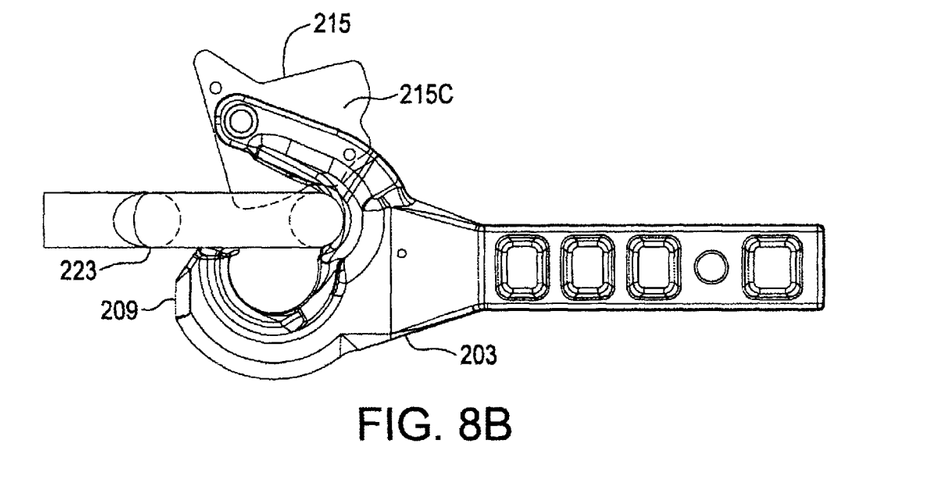
Figure 8C:
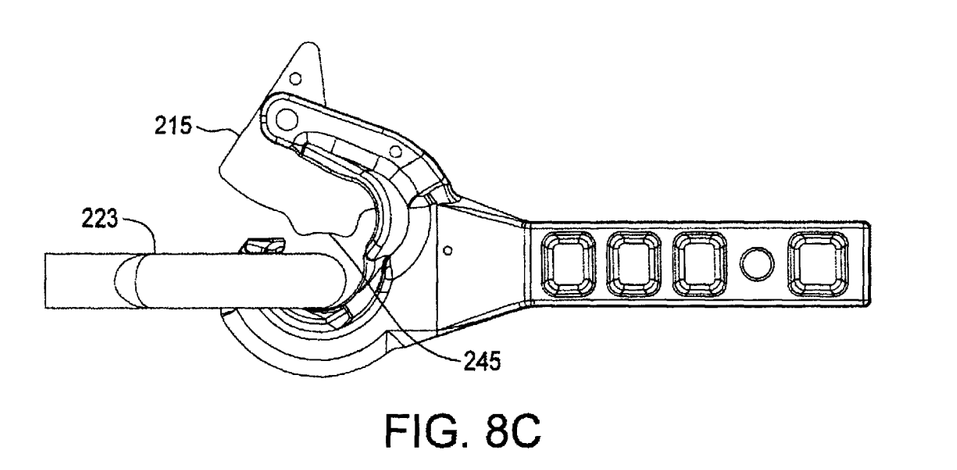

FIGS. 8-8C illustrated the operation of an alternate embodiment of an apparatus 201 of the present invention where the lock plate 215 is configured such that when in the closed position, a front portion 215C of the locking portion 215A thereof extends over a hitch recess 241 formed between the rear end of the base 203 and a top end of the pin 209. Fore and aft lugs 243A, 243B extending downward from the front portion 215C of the locking portion define a groove 245 above the hitch recess 241.

FIG. 8 illustrates the hitch apparatus 201 where the male hitch member 209 comprises a pin adapted to enter a ring opening 227 defined by the hitch ring 223 of a corresponding female hatch member provided by a hitch ring 223 attached to a hitch tongue of a towed vehicle as seen in FIG. 8A.

The hitch tongue is moved up or down as required to align the hitch ring 223 with the gap 213 in the hitch apparatus 201. FIG. 5A shows the hitch apparatus 201 moved rearward in direction R and the hitch ring 223 entering the gap 213 and pushing the locking portion 215A of the lock plate 215 forward, and as the apparatus 201 continues rearward the hitch ring 223 pushes the locking portion 215A farther forward until the front end of the hitch ring 223 contacts the hitch ring guide 229 on the rear end of the base 203 between the upper and lower jaws 211, 207 as shown in FIG. 8B, at which point rearward movement stops, and the portion of the lock plate 215 rearward of the aft lug 243A clears the hitch ring 223 and drops back down into the gap 213 and into the ring opening 227.

It can be seen that the hitch ring 223 is then prevented from moving rearward through the gap 213. When the hitch tongue and hitch ring 223 are lowered, the hitch ring 223 rests on the lower jaw 207 in the recess 241, and the lock plate 215 drops from the blocking position of FIG. 5B to the closed position of FIG. 5C. It can be seen that the hitch ring 223 is then prevented from moving upward above the top of the pin 209. If the hitch ring 223 moves upward, as for example sometimes happens when loading the towed vehicle, the top of the hitch ring 223 enters the groove 245 and the lock plate is prevented from moving by the lugs 243A, 243B.

The present invention provides a method of connecting a towed vehicle 25 to a towing vehicle 5. The method comprises attaching a forward end of a base 3 to the towing vehicle 5; providing a lower jaw 7 fixed to and extending rearward from the base 3, and providing an upward extending male hitch member 9 at a rear end of the lower jaw 7; providing an upper jaw 11 fixed to and extending rearward from the base 3 above the lower jaw 7 to a rear end thereof located above the male hitch member 9 such that a gap 13 is formed between the rear end of the upper jaw 11 and a top end of the male hitch member 9; pivotally attaching a lock plate 15 to a rear portion of the upper jaw 11 about a pivot axis PA oriented substantially perpendicular to an operating travel direction T of the towing vehicle 5 such that a locking portion 15A of the lock plate 15 extends downward into the gap 13 when the lock plate 15 is in a closed position; providing a closed stop 17 operative to prevent rearward movement of the locking portion 15A of the lock plate 15 when in the closed position such that the locking portion 15A can only pivot forward from the closed position; configuring the lock plate 15 such that when the lock plate 15 is in a pivotal position between the closed position and a balanced position, gravity biases the lock plate 15 toward the closed position; providing a female hitch member 23 on a front end of a hitch tongue attached to the towed vehicle 25 and aligning a vertical position of the female hitch member 23 with the gap 13; with the lock plate 15 in the closed position, moving the towing vehicle 5 rearward such that a front end of the female hitch member 23 moves through the gap 13 and pushes the locking portion 15A of the lock plate 15 forward; continuing moving the towing vehicle 5 rearward until the front end of the female hitch member 23 contacts the rear end of the base 3 between the upper and lower jaws 11, 7 where the lock plate drops toward the closed position to a blocking position preventing the female hitch member from moving rearward through the gap; lowering the female hitch member 23 into engagement with the male hitch member 9 at which point the lock plate 15 is in the closed position In the apparatus 1, the blocking position is the closed position, as once the front end of the hitch ring 23 is seated in the guide 29 at the base 3, the locking portion 15A is free to drop into the gap 13 as shown in FIG. 5E.

In contrast in the alternate apparatus 201, when the front end of the hitch ring 223 contacts the rear end of the base 203, the lock plate 215 only drops to a blocking position shown in FIG. 8B, and only drops from the blocking position to the closed position when the hitch ring 223 is lowered into engagement with the pin 209 as shown in FIG. 8C.

In both the apparatus 1 and the apparatus 201, the locking portion 15A, 215A of the lock plate 15, 215 prevents disengagement of the female hitch member 23, 223 from the male hitch member 9, 209.

The method further comprises disconnecting the towed vehicle 25 from the towing vehicle 5 by pivoting the locking portion 15A of the lock plate 15 forward from the closed position to clear the gap 13, raising the female hitch member 23 out of engagement with the male hitch member 9 and into alignment with the gap 13, and moving the towing vehicle 5 forward.

providing an open stop, and configuring the open and closed stops to limit pivoting movement of the lock plate to a pivot range from the closed position through the balanced position to an open position, and wherein when the lock plate is in a pivotal position between the balanced position and the open position, gravity biases the lock plate toward the open position.

An open stop 19 is configured to cooperate with the closed stop 17 to limit pivoting movement of the lock plate 15 to a pivot range from the closed position through the balanced position to the open position. When the lock plate 15 is in a pivotal position between the balanced position and the open position, gravity biases the lock plate toward the open position. The locking portion 15A of the lock plate 15 moves forward and upward as the lock plate 15 pivots from the closed position to the open position, and when the lock plate 15 is in the open position, the locking portion 15A extends upward from the pivot axis PA and the open stop prevents rearward movement of the locking portion. A resetting portion 15B on the lock plate 15 is oriented such that when the lock plate 15 is in the closed position the reetting portion 15B of the lock plate extends upward from the pivot axis PA, and when the lock plate 15 is in the open position the resetting portion 153 of the lock plate extends downward from the pivot axis PA into the gap 13.

The method can then further comprise disconnecting the towed vehicle 25 from the towing vehicle 5 by pivoting the locking portion 15A of the lock plate 15 forward from the closed position to the open position to clear the gap 13, raising the female hitch member 23 out of engagement with the male hitch member 9 and into alignment with the gap 13, and moving the towing vehicle 5 forward. Contact between the female hitch member 23 and the resetting portion 15B of the lock plate 15 causes the lock plate to move to the closed position, ready to reconnect to another female hitch member.

The present invention thus provides a simple and economical hitch apparatus that can include a convenient reset feature so same is always ready for connection to a towed vehicle. The female hitch member is securely held in engagement with the male hitch member by the lock plate which is prevented from moving because same bears against a stop, and does not require springs and latches as are known in the prior art.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A hitch apparatus for connecting a towed vehicle to a towing vehicle, the apparatus comprising:
   a base adapted at a forward end thereof for attachment to the towing vehicle;
   a lower jaw fixed to and extending rearward from the base, and a male hitch member extending upward from a rear end of the lower jaw;
   an upper jaw fixed to and extending rearward from the base above the lower jaw to a rear end thereof located above the male hitch member such that a gap is formed between the rear end of the upper jaw and a top end of the male hitch member;
   a lock plate pivotally attached to a rear portion of the upper jaw about a pivot axis oriented substantially perpendicular to an operating travel direction;
   a closed stop and an open stop, the stops operative to limit pivoting movement of the lock plate to a pivot range from a closed position through a balanced position to an open position;
   wherein the lock plate is configured such that when the lock plate is in the pivot range between the closed position and the balanced position gravity biases the lock plate toward the closed position, and when the lock plate is between the balanced position and the open position gravity biases the lock plate toward the open position;
   wherein when the lock plate is in the closed position, a locking portion of the lock plate extends downward from the pivot axis into the gap and the closed stop prevents rearward movement of the locking portion;
   wherein the locking portion of the lock plate moves forward and upward as the lock plate pivots from the closed position to the open position, and when the lock plate is in the open position, the locking portion extends upward from the pivot axis and the open stop prevents rearward movement of the locking portion.

2. The apparatus of claim 1 wherein the lock plate comprises a resetting portion oriented such that when the lock plate is in the closed position the resetting portion of the lock plate extends upward from the pivot axis, and when the lock plate is in the open position the resetting portion of the lock plate extends downward from the pivot axis into the gap.

3. The apparatus of claim 2 wherein the male hitch member comprises a pin adapted to enter a ring opening defined by a hitch ring attached to a hitch tongue of the towed vehicle.

4. The apparatus of claim 3 wherein a rear end of the base between the upper and lower jaws defines a hitch ring guide configured to align the ring opening with the pin.

5. The apparatus of claim 4 wherein when the lock plate is in the closed position, a front portion of the locking portion thereof extends over a hitch recess formed between the rear end of the base and a top of the pin.

6. The apparatus of claim 5 wherein when the lock plate is in the closed position, fore and aft lugs extending downward from the front portion of the locking portion define a groove above the hitch recess.

7. The apparatus of claim 2 wherein a top end of the male hitch member defines a ball adapted to enter a socket defined by a socket member attached to a hitch tongue of the towed vehicle.

8. The apparatus of claim 7 wherein a rear end of the base between the upper and lower jaws defines a socket guide configured to align the socket with the ball.

9. The apparatus of claim 1 wherein when the lock plate is in the balanced position, the locking portion thereof is above a lower edge of the upper jaw.

10. The apparatus of claim 1 further comprising a safety pin removably inserted in corresponding aligned safety holes in the upper jaw and lock plate when the lock plate is in the closed position.

11. A method of connecting a towed vehicle to a towing vehicle, the method comprising:
    attaching a forward end of a base to the towing vehicle;
    providing a lower jaw fixed to and extending rearward from the base, and providing an upward extending male hitch member at a rear end of the lower jaw;
    providing an upper jaw fixed to and extending rearward from the base above the lower jaw to a rear end thereof located above the male hitch member such that a gap is formed between the rear end of the upper jaw and a top end of the male hitch member;
    pivotally attaching a lock plate to a rear portion of the upper jaw about a pivot axis oriented substantially perpendicular to an operating travel direction of the towing vehicle such that a locking portion of the lock plate extends downward into the gap when the lock plate is in a closed position;
    providing a closed stop operative to prevent rearward movement of the locking portion of the lock plate when in the closed position such that the locking portion can only pivot forward from the closed position;
    configuring the lock plate such that when the lock plate is between the closed position and a balanced position, gravity biases the lock plate toward the closed position;
    providing a female hitch member on a front end of a hitch tongue attached to the towed vehicle and aligning a vertical position of the female hitch member with the gap;
    with the lock plate in the closed position, moving the towing vehicle rearward such that a front end of the female hitch member moves through the gap and pushes the locking portion of the lock plate forward;
    continuing moving the towing vehicle rearward until the front end of the female hitch member contacts a rear end of the base between the upper and lower jaws, where the lock plate drops toward the closed position to a blocking position preventing the female hitch member from moving rearward through the gap;
    lowering the female hitch member into engagement with the male hitch member, at which point the lock plate is in the closed position and the locking portion prevents disengagement of the female hitch member from the male hitch member.

12. The method of claim 11 further comprising disconnecting the towed vehicle from the towing vehicle by pivoting the locking portion of the lock plate forward from the closed position to clear the gap, raising the female hitch member out of engagement with the male hitch member and into alignment with the gap, and moving the towing vehicle forward.

13. The method of claim 11 comprising providing an open stop, and configuring the open and closed stops to limit pivoting movement of the lock plate to a pivot range from the closed position through the balanced position to an open position, and wherein when the lock plate is in a pivotal position between the balanced position and the open position, gravity biases the lock plate toward the open position.

14. The method of claim 13 wherein the locking portion of the lock plate moves forward and upward as the lock plate pivots from the closed position to the open position, and when the lock plate is in the open position, the locking portion extends upward from the pivot axis and the open stop prevents rearward movement of the locking portion.

15. The method of claim 14 comprising providing a resetting portion on the lock plate oriented such that when the lock plate is in the closed position the resetting portion of the lock plate extends upward from the pivot axis, and when the lock plate is in the open position the resetting portion of the lock plate extends downward from the pivot axis into the gap.

16. The method of claim 15 comprising disconnecting the towed vehicle from the towing vehicle by pivoting the locking portion of the lock plate forward from the closed position to the open position to clear the gap, raising the female hitch member out of engagement with the male hitch member and into alignment with the gap, and moving the towing vehicle forward, and wherein contact between the female hitch member and the resetting portion of the lock plate causes the lock plate to move to the closed position.

17. The method of claim 16 wherein the female hitch member comprises a hitch ring and the male hitch member comprises a pin adapted to enter a ring opening defined by the hitch ring, and wherein a forward portion of the hitch ring contacts the resetting portion of the lock plate as the towing vehicle moves forward to move the lock plate to the closed position.

18. The method of claim 17 wherein the rear end of the base defines a hitch ring guide configured to align the ring opening with the pin.

19. The method of claim 17 wherein when the lock plate is in the closed position a front portion of the locking portion of the lock plate extends over a hitch recess formed between the rear end of the base and a top of the pin, and wherein fore and aft lugs extending downward from the front portion define a groove configured to engage a top of the hitch ring.

20. The method of claim 19 wherein when the lock plate is in the blocking position, the front end of the hitch ring bears against the aft lug, and a rear portion of the locking portion extends into the gap.

21. The method of claim 20 wherein lowering the female hitch member into engagement with the male hitch member allows the lock plate to drop from the blocking position to the closed position where the groove is located above the top of the hitch ring and the top of the hitch ring is substantially prevented from moving above the top of the pin.

22. The method of claim 16 wherein the female hitch member comprises a socket member and the male hitch member defines a ball adapted to enter a socket defined by the socket member, and wherein a top side of the socket member contacts the resetting portion of the lock plate as the female hitch member is raised out of engagement with the male hitch member to move the lock plate to the closed position.

23. The method of claim 22 wherein the rear end of the base defines a socket guide configured to align the socket with the ball.

24. The method of claim 11 wherein when the lock plate is in the balanced position, the locking portion thereof is above a lower edge of the upper jaw.

25. The method of claim 11 further comprising providing corresponding safety holes in the upper jaw and lock plate that are aligned when the lock plate is in the closed position, and inserting a safety pin through the aligned safety holes to prevent movement of the lock plate out of the closed position.

* * * * *